Aug. 31, 1926.
J. W. BENNER
MOSS GATHERING DEVICE
Filed June 5, 1925
1,598,514
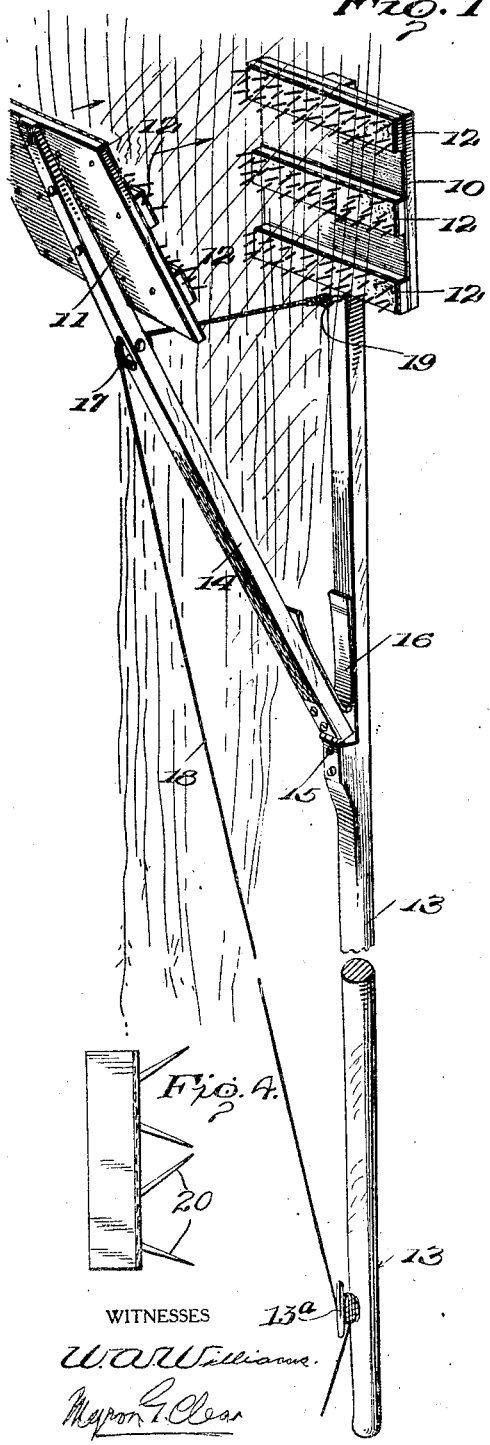
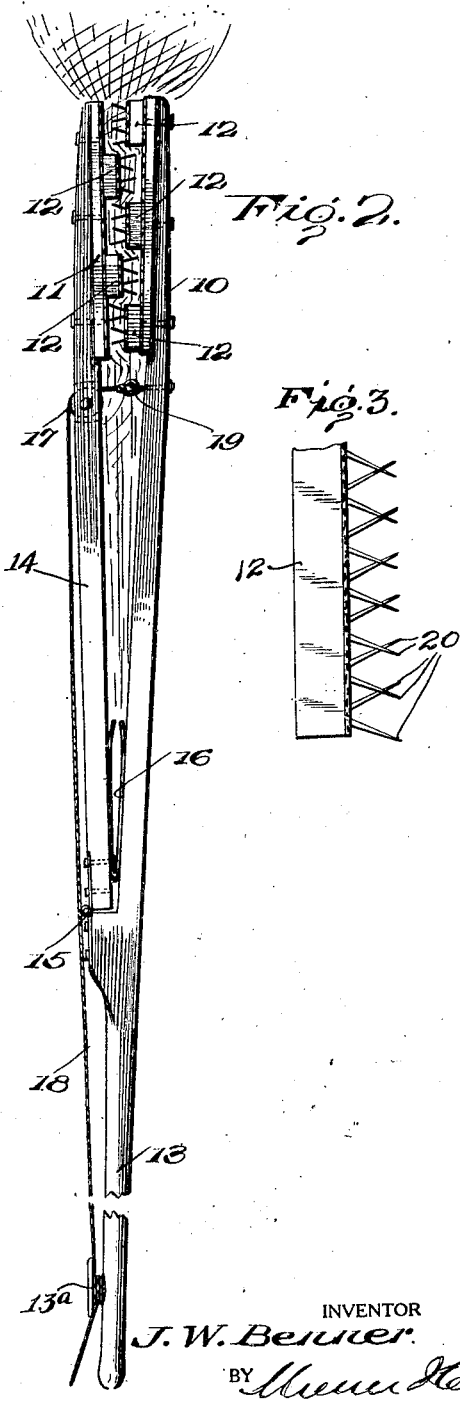
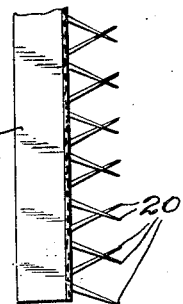
INVENTOR
J. W. Benner.
BY
ATTORNEYS
WITNESSES Patented Aug. 31, 1926.

1,598,514

UNITED STATES PATENT OFFICE.

JOHN WESLEY BENNER, OF OXFORD, FLORIDA.

MOSS-GATHERING DEVICE.

Application filed June 5, 1925. Serial No. 35,170.

My present invention relates particularly to devices for gathering of Spanish moss from the trees in tropical climates and has for its primary object the provision of an apparatus which may be used from the ground and by means of which the tenacious and objectionable tree moss may be effectively and easily gripped and torn loose.

A further object is the provision of a simple inexpensive apparatus for the above purpose which may be easily handled, readily manipulated, and will permit of a strong tight gripping of the moss.

In the accompanying drawing which illustrates my present invention and forms a part of this specification, Figure 1 is a perspective view of the apparatus in its open position, Figure 2 is a side view with the same closed, Figure 3 is an enlarged detail end view of one of the grippers, and Figure 4 is an enlarged detail side view of a portion of one of the grippers.

Referring now to these figures, my invention proposes an apparatus of the present character and for the above-named purpose which comprises a pair of complementary jaw members 10 and 11 having across their opposing faces grippers 12. The jaw member 10 is preferably fixed in any suitable manner to one end of a pole 13 of considerable length whereby to conveniently reach up into the trees where the moss hangs.

The jaw member 11, on the other hand, is fixed upon one end of an arm 14 whose opposite end is hingedly connected at 15 to the pole 13 so that jaw 11 will swing against jaw 10 in face to face relation as plainly shown in Figure 2. Adjacent to the connecting hinge 15, a V-shaped spring 16 is disposed between the arm 14 and the pole 13 to normally force the former away from the latter. This spring 16 is preferably secured to the arm 14 as it may be connected thereto by one or more of the fastening members of the hinge 15.

In an aperture through the arm 14 immediately below the jaw 11, a pulley 17 is mounted to receive thereover a flexible connection or central member such as a rope or flexible wire 18 one end of which is extended through the aperture of the arm and across the space between the arm and the pole and is anchored at its extremity to the pole as at 19. The other end of the control connection 18 depends along the pole 13 to its lower or handle end for ready manipulation by the operator of the implement, and for engagement with a cleat 13$^a$ on the pole 13 adjacent to its handle end whereby to hold the jaws in engaged relation.

As plainly shown in Figure 3, each of the several grippers has a rectangular body from the effective face of which longitudinal rows of gripping spurs or spikes 20 project. These spurs or spikes in each row are similarly inclined toward one end of the gripper, and in the several rows are inclined in alternately opposite directions. Moreover the grippers of one jaw are spaced apart a sufficient distance to receive therebetween the grippers of the other jaw as plainly seen in Figure 2. Thus the jaw 10 is shown provided with three grippers to receive between them the two grippers of the jaw 11 when the jaws are shifted into engagement.

In operation it is obvious the pole 13 is shifted by the operator so as to position the jaws 10 and 11 at opposite sides of a bunch of moss, the jaws being, at this time, spread apart by the spring. The operator then pulls on the control connection which forces the movable jaw against the stationary jaw so that the moss will be effectively gripped whereby it may be pulled loose from the tree by the operator pulling this time upon the pole 13.

The device as a whole may be made easily and cheaply and at the same time strong and durable without such weight as to interfere with its ready manual manipulation and operation.

I claim:

An apparatus of the present character including an elongated pole forming a handle at one end, a jaw carried by the opposite end of the pole, an arm hinged at one end to the pole intermediate the ends of the latter, a jaw carried by the other end of said arm and shiftable therewith toward and away from the first jaw, a spring for forcing the arm away from the pole, and a flexible connection engaging the arm and pole and depending along the latter adjacent to the handle for shifting the arm toward the pole, said jaws having series of transversely disposed grippers, the grippers of one jaw being spaced apart to receive the grippers of the other jaw therebetween and each of said grippers having rows of clamping spikes projecting therefrom and alternately inclined in opposite directions.

JOHN WESLEY BENNER.